(12) United States Patent
Rajopadhye (10) Patent No.: US 10,325,226 B2
(45) Date of Patent: Jun. 18, 2019

(54) BRAND IMPACT VERIFICATION SYSTEM

(75) Inventor: Nagesh Rajopadhye, Pune (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1740 days.

(21) Appl. No.: 13/026,523

(22) Filed: Feb. 14, 2011

(65) Prior Publication Data

US 2012/0174073 A1 Jul. 5, 2012

(30) Foreign Application Priority Data

Dec. 31, 2010 (IN) .......................... 4040/CHE/2010

(51) Int. Cl.
| | |
|---|---|
| G06Q 10/06 | (2012.01) |
| G06Q 30/02 | (2012.01) |
| G06Q 30/06 | (2012.01) |
| G06Q 30/00 | (2012.01) |
| G06Q 10/10 | (2012.01) |

(52) U.S. Cl.
CPC .......... *G06Q 10/06* (2013.01); *G06Q 10/103* (2013.01); *G06Q 10/105* (2013.01); *G06Q 30/00* (2013.01); *G06Q 30/02* (2013.01); *G06Q 30/0235* (2013.01); *G06Q 30/0255* (2013.01); *G06Q 30/06* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
USPC .............................................. 705/7.11–7.42
See application file for complete search history.

(56) References Cited

U.S. PATENT DOCUMENTS

| | | | |
|---|---|---|---|
| 6,430,609 B1 * | 8/2002 | Dewhurst | ........... G06F 17/5018 709/220 |
| 6,753,887 B2 | 6/2004 | Carolan et al. | |
| 6,862,585 B2 | 3/2005 | Planalp et al. | |
| 7,188,342 B2 | 3/2007 | DeMello et al. | |

(Continued)

OTHER PUBLICATIONS

E. McKay, 'Effective software branding', May 11, 2010 [Retrieved from internet on Mar. 8, 2013].

(Continued)

*Primary Examiner* — Anita Coupe
*Assistant Examiner* — Uche Byrd
(74) *Attorney, Agent, or Firm* — Mannava & Kang, P.C.

(57) ABSTRACT

A system to perform brand impact verification (BIV) for a utilization-related software application (URSA), associated with an identity and a software development process (SDP) including multiple phases. The system includes a requirements-design module to determine brand characteristics of a brand associated with the identity, and software application properties associated with the URSA. The system also includes a BIV testing engine, executed by a computer system, to identify design test procedures to produce quantitative and qualitative design test results based on the determined brand characteristics and the determined software application properties. The BIV testing engine also implements the design test procedures to generate design test results in an SDP design step of an SDP associated with the URSA. The design test procedures are implemented in the SDP in a SDP design step prior to implementing an SDP full implementation test step testing a full implementation of the URSA.

21 Claims, 5 Drawing Sheets

(56) References Cited

U.S. PATENT DOCUMENTS

| | | | |
|---|---|---|---|
| 7,783,981 B2 | 8/2010 | Tyhurst | |
| 2004/0204946 A1 | 10/2004 | Alger et al. | |
| 2005/0050320 A1 | 3/2005 | Wassmann et al. | |
| 2005/0256844 A1* | 11/2005 | Cristol | 707/2 |
| 2006/0020506 A1 | 1/2006 | Axe et al. | |
| 2006/0047599 A1 | 3/2006 | Denne et al. | |
| 2007/0157159 A1 | 7/2007 | Fildebrandt et al. | |
| 2007/0172113 A1* | 7/2007 | Sai et al. | 382/159 |
| 2008/0104012 A1 | 5/2008 | Nolan et al. | |
| 2010/0185520 A1* | 7/2010 | Gottfried | 705/14.73 |
| 2010/0262558 A1* | 10/2010 | Edwards | G06Q 10/00 |
| | | | 705/348 |

OTHER PUBLICATIONS

Winston Royce, 'Managing the Development of Large Software Systems', Proceedings of IEEE WESCON 26, 1970, p. 1-11. Downloaded online on Sep. 13, 2013 at http://www.cs.umd.edu/class/spring2003/cmsc838p/Process/waterfall.pdf.

Australia Government, IP Australia, 'Patent Examination Report No. 2' on patent application No. AU 2011256921, dated Aug. 13, 2013.

Gilliam, Todd, "Proving Branding Effect of Web Advertising", Atlas Institute Digital Marketing Insights.

Hislop, Molly, "Branding 101: An Overview of Branding and Brand Measurement for Online Marketers", Dynamic Logic, Apr. 2001.

\* cited by examiner

BRAND IMPACT VERIFICATION SYSTEM

BACKGROUND

Branding is the process of publicly associating an idea, quality, sentiment or similar things with an identity. The identity commonly belongs to a company or a product. Effective branding for a company, or the company's products and/or services, has become increasingly important to achieve success. While branding may be accomplished through many venues, such as advertising on a website, printed materials, audiovisuals or company involvement in social projects, another venue with growing prevalence is through software applications by which users or consumers interact with the company. These interactions may involve how the products and/or services are provided by the company, or how information about the products and/or services is provided.

In many instances, software applications themselves are goods sold by a company. These instances, for example, may include companies that develop and sell business applications, such as word processing applications, spreadsheets, etc., video games, operating systems, and other types of applications. In these instances, a company typically includes branding in the software products, and branding may be considered and incorporated throughout the development of the software product.

In other instances, a company and its customers may use a software application which is developed for the company, but the company does not sell the software application as a product. In these instances, typically little or no consideration is given to brand (of a product or company) associated with the application because the software application is not the company's product offered for sale and secondly the focus of the development is on the technical/functional aspects of the application. However, even in these instances, branding may still impact a customer's perception of the company or product, which can affect sales of the company's products or services.

For example, a company selling vehicles may develop a software application which allows its customers to obtain financing online. The software application runs on a server processing financing applications, and customers access the software application through a web portal to the server. The primary development considerations to the developers for these types of software applications tend to be the utility aspects, such as user convenience, user ease-of-use, integration of application with the back end systems, technology architecture, etc. Brand impact may not be considered at all by the developers, or it may only be considered to the extent that a company logo is included on graphical user interface (GUI) screens of the software application.

As a result, brand characteristics of a brand associated with the company, its products and/or its services, may not coincide or may even conflict with the utility software application properties associated with the software application. This disconnect or conflict may cause negative sentiment among users of the software application, or it may present the brand in a manner which is inconsistent with the established branding characteristics of the company, its products and/or services. It may even dilute the brand causing a loss of goodwill toward the brand, and thus the company, resulting in an economic loss to the company.

In addition, a design team associated with developing a large or complex software application may include scores or even hundreds of software developers. These may be involved in developing different sub-programs and various aspects of the software application, which may be completely unrelated at the sub-program development level. Furthermore, the broad nature of the different environments in which the software application might be implemented, can present multiple impediments to accomplishing effective branding of a company or product associated with the software application. Due to these difficulties, providing and maintaining effective branding of a company or a product or service associated with software applications which are not company products is a growing challenge.

BRIEF SUMMARY OF THE INVENTION

According to a first embodiment is a system to perform brand impact verification (BIV) for a utilization-related software application (URSA). The URSA is associated with an identity and a software development process (SDP) including multiple phases. The system includes a requirements-design module to determine brand characteristics of a brand associated with the identity, and software application properties associated with the URSA. The system also includes a BIV testing engine, executed by a computer system, to identify design test procedures to produce at least one of quantitative and qualitative design test results associated with a brand impact being verified based on the determined brand characteristics and the determined software application properties. The BIV testing engine implements the design test procedures to generate design test results in an SDP design step of an SDP associated with the URSA. The design test procedures are implemented in the SDP in a SDP design step prior to implementing an SDP full implementation test step testing a full implementation of the URSA.

According to a second embodiment is a method of performing brand impact verification (BIV) for a utilization-related software application (URSA). The URSA is associated with an identity and a software development process (SDP) including multiple phases. The method includes determining brand characteristics of a brand associated with the identity and determining software application properties associated with the URSA. The method also includes identifying design test procedures to produce at least one of quantitative and qualitative design test results. The results are associated with a brand impact being verified based on the determined brand characteristics and the determined software application properties. The method also includes implementing the design test procedures, by a computer, to generate design test results in an SDP design step of an SDP associated with the URSA. The design test procedures are implemented in the SDP in a SDP design step prior to implementing an SDP full implementation test step testing a full implementation of the URSA.

According to a third embodiment is a non-transitory computer readable medium storing computer readable instructions that when executed by a computer system perform method of performing brand impact verification (BIV) for a utilization-related software application (URSA). The URSA is associated with an identity and a software development process (SDP) including multiple phases. The method includes determining brand characteristics of a brand associated with the identity and determining software application properties associated with the URSA. The method also includes identifying design test procedures to produce at least one of quantitative and qualitative design test results. The results are associated with a brand impact being verified based on the determined brand characteristics and the determined software application properties. The method also includes implementing the design test procedures, by a computer, to generate design test results in an SDP design step of an SDP associated with the URSA. The design test procedures are implemented in the SDP in a SDP design step prior to implementing an SDP full implementation test step testing a full implementation of the URSA.

BRIEF DESCRIPTION OF THE DRAWINGS

Embodiments are described in detail in the following description with reference to the following figures. The embodiments are illustrated by way of example and are not limited in the accompanying figures in which like reference numerals indicate similar elements.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. Definitions

The term software development process (SDP), as used herein, is a structured approach to developing and/or constructing a software application which may occur in stages prior to a completion of the SDP defined by the attainment of a completed software application. The completed software application may include separate sub-programs which may have been developed and/or tested separately prior to the completion. The SDP for the software application may include multiple development stages. In the different stages, different criteria may be tested and/or analyzed in one or more environments. The SDP may be divided into different types of development stages associated with planning, design, coding (i.e., implementation), testing and measuring, documentation, deployment, maintenance and/or debugging and these may overlap each other and occur in varied sequences. One illustrative example is the SDP waterfall model, which includes a sequence of stages associated with establishing requirements, design, implementation, verification and maintenance occurring in the stated order. However, stages associated with establishing requirements for a software application and designing it regularly occur earliest in any SDP.

The term software application, as used herein, refers to a computer program designed to enable or assist a user to perform singular or multiple related specific tasks. Examples include enterprise software, time and resource management software, data management software, customer service application, documentation software, feedback providing applications, reservation systems, financial software, content access software, educational software, purchase processing systems, service distribution systems, utility programs, office suites and individual office applications, such as word processors, spreadsheets and the like. In one example, a software application excludes a website, but does not exclude a software application accessed or associated with a website, such as a purchase processing system which may be accessed by a user through a website acting as a portal to the purchase processing system.

The term website, as used herein, refers to a collection of related websites pages, images, videos or other digital assets which are addressed relative to a common Uniform Resource Locator (URL), often consisting of only a domain name or an IP address and a root path in an Internet Protocol-based network. A website is hosted on at least one website server, accessible via a network such as the Internet or a private local area network.

The term product line, as used herein, refers to a number of products which may be related and are developed by the same manufacturer, distributed by the same distributor and/or sold by the same seller.

The term service line, as used herein, refers to a number of services which may be related and are delivered by the same provider, distributed by the same distributor and/or sold by the same seller.

The term product, as used herein, refers to a product in a product and may also refer to a service in a service line.

The term utilization related software application (URSA), as used herein, refers to a software application which a company and its customers may use. A URSA is often a software application developed specifically for the company. However, a URSA is not a company product in the company product line. Also, a URSA is not a company website, although it is may be a software application which is accessed through a company website to provide a customer service or function.

2. Systems

BIV System

Figure 1:
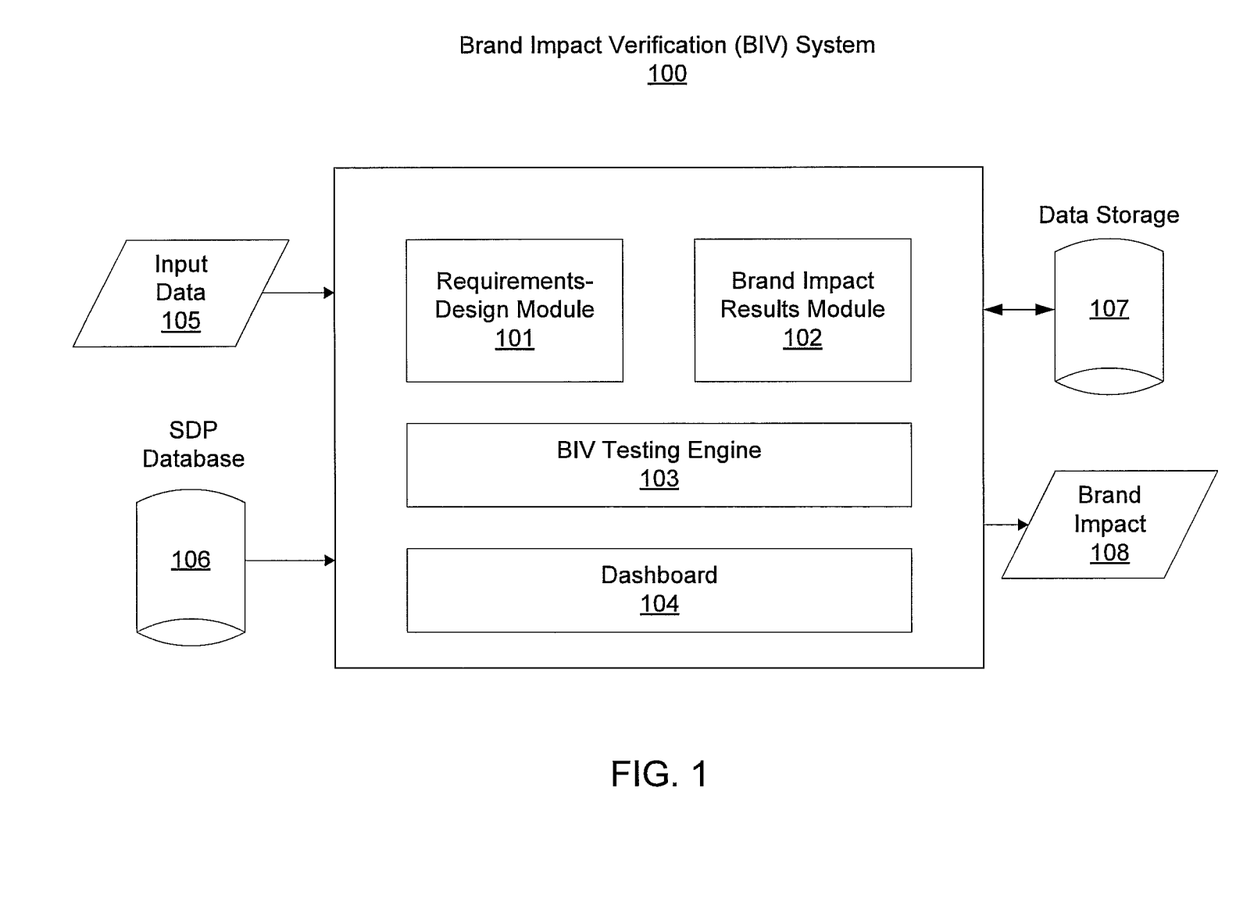
FIG. 1 is a block diagram illustrating a Brand Impact Verification (BIV) system 100, according to an embodiment.

A BIV system, such as the BIV system 100 illustrated in FIG. 1, enables it's users to effectively perform precise, accurate and efficient BIV testing and measuring on a URSA under development in a software development project (SDP). The BIV system 100 may include a requirements-design module 101, a brand impact results module 102, a BIV testing engine 103, a dashboard 104 and a data storage 107. The BIV system 100 receives input data 105 about the URSA, generally, through a user interface, such as the dashboard 104. The BIV system 100 may also receive data or parameters relating to a SDP from an SDP database 106. The SDP database 106 provides SDP data associated with one or more SDP phases applied to the URSA under development. The BIV system 100 processes the various inputs and transmits brand impact data 108, generally, through the brand impact results module 102. The brand impact data 108 may be viewed via the dashboard 104 and/or stored in the data storage 107.

The input data 105 may include brand characteristics or descriptors and/or modifiers describing or otherwise related to brand characteristics. Examples of brand characteristics may include logos, color schemes, catch phrases, implied message, visual appearance, value measures, credibility measures, relevancy measures, etc. Brand characteristics may also include themes, such as environmentally friendly or green, equal opportunity, cutting edge, etc. The input data 105 may include modeling data associated with the brand characteristics, such as descriptors and modifiers. These may include objective and/or subjective measures associated with the brand characteristics or which can be used to determine new brand characteristics. The input data 105 may also include URSA properties or descriptors and/or modifiers relating to software application properties. Examples of software application properties may include convenience, portability, aspects of a graphical user interface, software functions. The input data 105 may include modeling data associated with the software application properties such as objective and/or subjective measures associated with the software application properties. The BIV system 100 operates to verify branding impact in a URSA while it is still under development in an SDP. It may also be used to verify similar items in a previously completed computer program or sub-program after it has been completed, deployed and is being utilized. The input data 105 includes modeling data 203 and scenario data 204, as are described in greater detail below.

The BIV system 100 includes the requirements-design module 101 and the brand impact results module 102. The requirements-design module 101 receives and stores input data 105 regarding brand characteristics and software application properties which may be provided through a client statement describing the software application properties and brand characteristics desired by the client.

Brand characteristics and software application properties may be received at the BIV system 100 from other sources providing similar or related information about a brand or a proposed URSA. The requirements-design module 101 may categorize and/or format the input data 105 for storage in the SDP database 106 or for utilization in the various phases of an SDP. The requirement-design module 101 may also identify design test procedures, as described in the examples below, based on the brand characteristics and the software application properties. The requirements-design module 101 may be automated to develop new design test procedures based on the input data 105 using programmed algorithms. The requirements-design module 101 may also draw from previously stored design test procedures stored in the SDP database 106.

The brand-impact results module 102 manages data generated through implementing design test procedures in a BIV testing engine 103. The brand-impact results module 102 receives and stores this data. The brand-impact results module 102 may also be utilized to analyze this data. In addition, the brand-impact results module 102 also provides reports about the generated data, for example, through the dashboard 104 or in brand impact reports 108.

BIV Testing Engine

Figure 2:
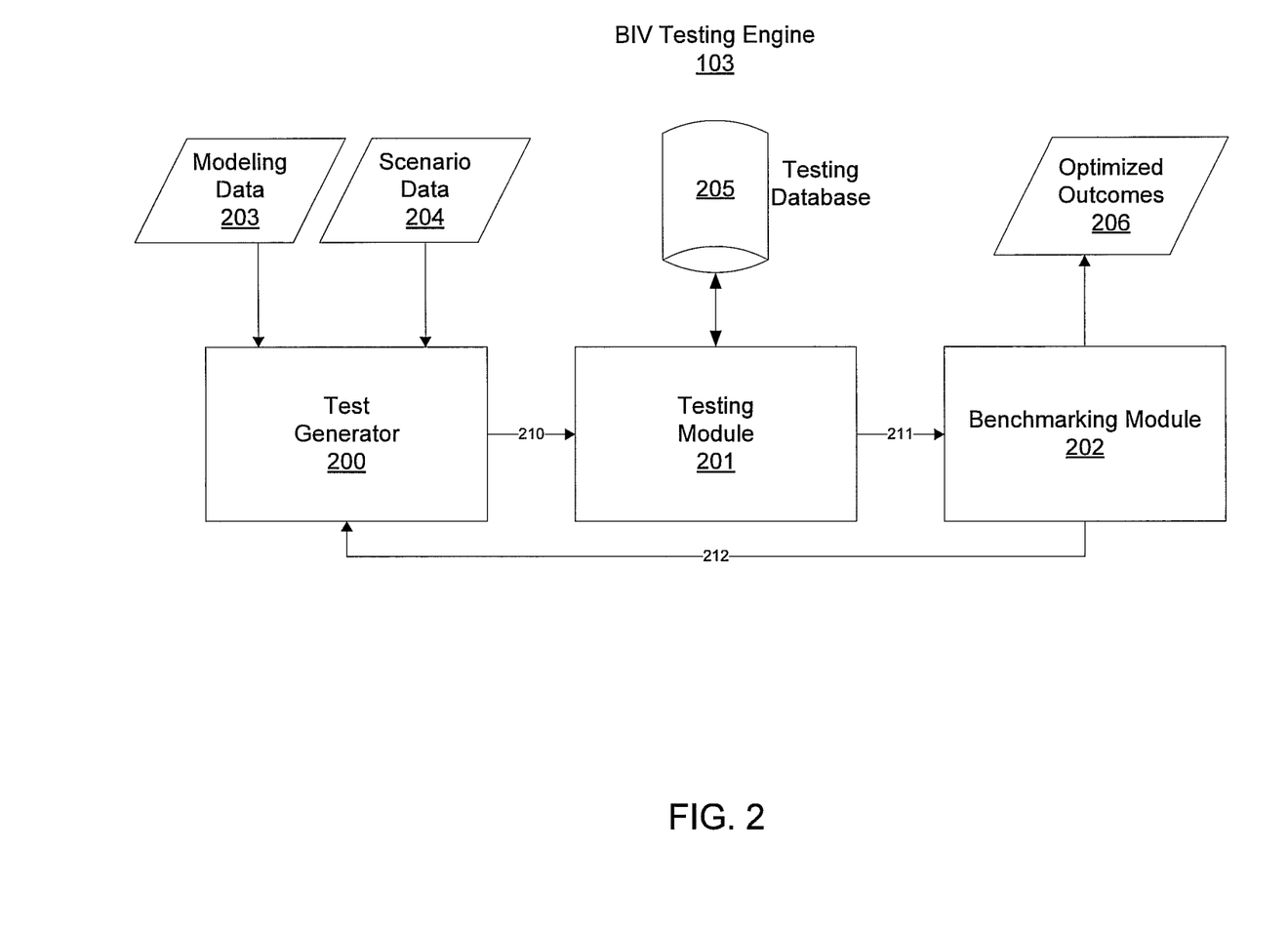
FIG. 2 is a block diagram illustrating a Brand Impact Verification (BIV) testing engine in the BIV system 100 shown in FIG. 1, according to an embodiment.

In FIG. 2, the BIV testing engine 103 in the BIV system 100 is illustrated in greater detail. The BIV testing engine 103 includes a test generator 200, a testing module 201, and a bench-marking module 202. The test generator 200 receives input data 105 including modeling data 203 which may be received through the dashboard 104. The modeling data 201 may include information, as described above, which is ancillary or related to the brand characteristics and/or software application properties. But this ancillary information assists in defining these items so that design test procedures can be identified to test against the URSA under development in the SDP. For example, a brand characteristic in input data 105 is received as input identified in a client statement about color, such as steel-gray. The modeling data 203 associated with that brand characteristic may include information defining pigmentation and modalities of chromaticity ranges which define the color steel-gray by objective measures. In another example of modeling data 203, a software application property may be efficiency in order processing. The modeling data 203 associated with this may include information which describes an industry standard for efficient order processing in a URSA. Modeling data 203 may also be received from the SDP database 106. The SDP database 106 may store information and/or parameters associated with brand characteristics, software application properties, and metadata associated with these items for indexing and retrieval as needed by the BIV testing engine 103.

The test generator 200 may also receive scenario data 204, which may be received through the dashboard 104 or other inputs. The scenario data 204 may include what-if type parameters, such as what if the URSA were used in a circumstance in which external technical difficulties, such as a power outage occurs. Scenario data 204 may also include proposed solutions associated with user demographics regarding user impressions of either the brand characteristics and/or the software application property. An example of this is a proposed solution or outcome to the scenario involving the power outage. The proposed solution may be incorporating a function into the URSA by which notifications are given to the user advising of the technical difficulties. According to one proposed solution, the notification is to be delivered in a manner consistent with a brand characteristic of reliability. This proposed solution, when defined by metadata indexing terms, provides the SDP database 106 with searchable data to extract stored information regarding software application properties and/or brand characteristics which are in line with the proposed solution. Once extracted from the SDP 106, this information is received as scenario data 204 at the test generator 200 where it is utilized to identify design test procedures 210.

The test generator 200 supplies the identified design test procedures 210 identified in the test generator 200 to a testing module 201. The testing module 201 implements the design test procedures 210 producing preliminary design test results 211 which are provided to a benchmarking module 202. The testing module 201 may store the deign test procedures 210 and the preliminary design test results 211 in a testing database 205 for later referencing based on a processing outcome in the benchmarking module 202.

The benchmarking module 202 compares the received preliminary design test results 211 with desired outcomes associated with the brand characteristics and software application properties received with the input data 105. If the preliminary design test results 211 meet the desired outcomes, they are adopted as optimized outcome data 206 which are reported, for example, through the dashboard 104 or through other reporting mechanisms, and sent to the brand impact results module 102.

For those preliminary design test results 211 which do not qualify as desired outcomes, these are reported as feedback data 212 to the test generator 200. The feedback data 212 is utilized at the test generator 200 in selecting alternate modeling data 203 and/or scenario data 204, for identifying alternate design test procedures 210. These alternate data and parameters may then processed through the BIV testing engine 103, according to the process described above, with the goal of achieving the desired optimized outcomes 206 which may be utilized in the SDP in designing, testing and measuring or building the proposed URSA.

3. Examples

SDP Example

Figure 3:
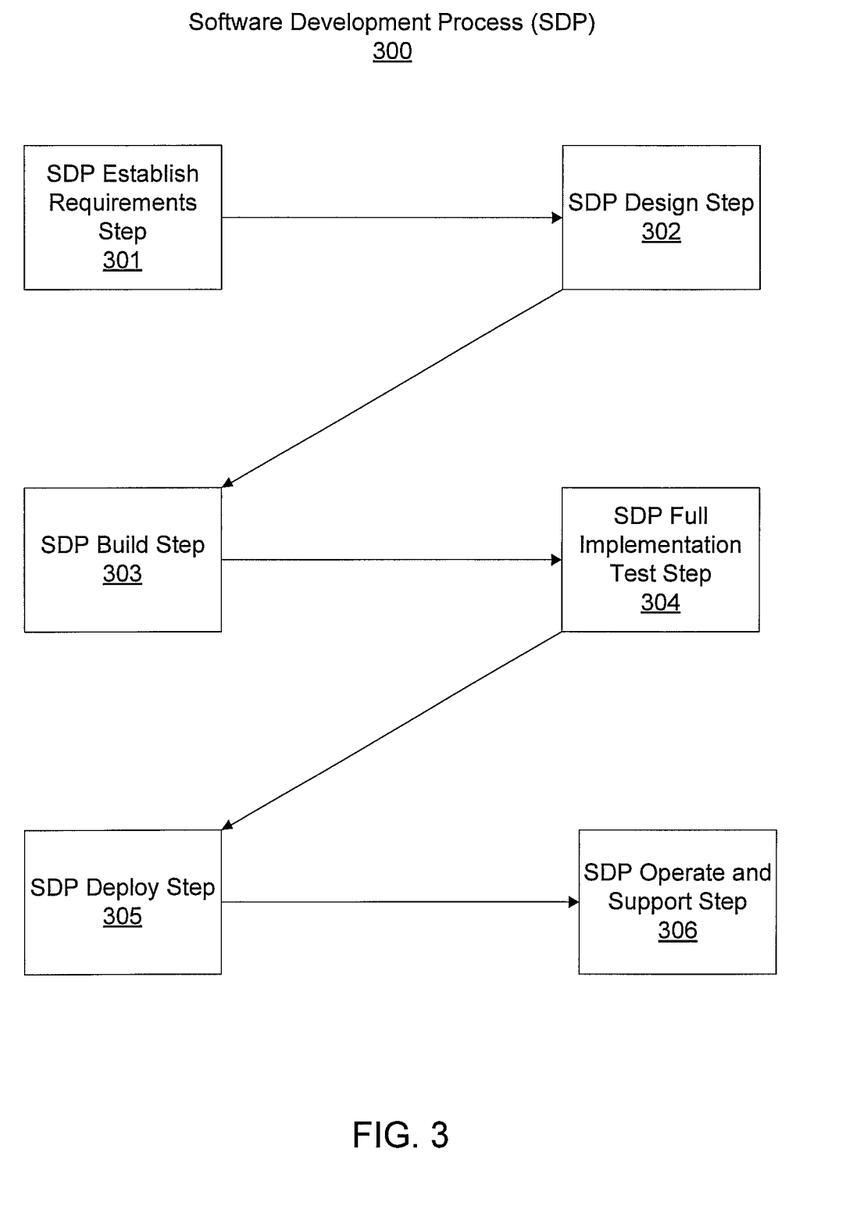
FIG. 3 is a flowchart illustrating a Software Development Process (SDP) 300, according to an embodiment.

An illustrative example of an SDP 300 is now described demonstrating a utilization of the BIV system 100 and the BIV testing engine 103 in the SDP 300, according to an embodiment. In this embodiment, the URSA under development in the SDP 300 is associated with an identity such as the identity of a company on whose behalf the URSA is developed.

The SDP 300 includes a SDP establish requirements step 301 in which planning information and requirements data are received at the requirements-design module 101 and utilized there to determine brand characteristics and/or software application properties. These may be determined based on the input data 105 alone, or in conjunction with interactions between the requirements-design module 101 and the SDP database 106.

The next step is an SDP design step 302 in which a design test plan may be formulated utilizing the BIV testing engine 103. The design test plan may include testing and measuring procedures associated with testing and measuring utility aspects of the URSA and/or design test procedures associated with BIV desired outcomes. The BIV procedures used are identified as design test procedures based on the brand characteristics and/or software application properties. The design test procedures are implemented and generate design test results which may be forwarded to the brand impact results module 102 and analyzed there.

Subsequent steps in the SDP 300 associated with the URSA under development may also include an SDP build step 303 in which a full implementation, working version, of the URSA is coded and any sub-modules of the URSA coded separately may be joined to establish a full working prototype of the complete URSA for testing and measuring. The build step 303 may include multiple sub-steps for building and testing each module. Another step is an SDP full implementation test step 304 in which the full implementation of the URSA, including any joined sub-modules of the URSA is tested. Another step is an SDP deploy step 305 in which the full implementation of the URSA is deployed and used in the environment associated with the end-use of the completed URSA. Another step is an SDP operate and support step 306 in which the deployed version of the URSA is already being used in the environment associated with its end-use, however, minor changes and design changes may still be implemented as part of the SDP. These later steps in the SDP 300 may each include procedures associated with developing purely utility aspects (i.e., aspects not associated with brand impact considerations and goals) of the URSA. However, these later SDP steps may also include BIV testing and measuring procedures performed concurrently with the utility aspect testing procedures in each SDP step.

URSA for Digital Marketing Example

An illustrative example of a URSA directed to digital marketing is now described in demonstrating a utilization of the BIV system 100 and the BIV testing engine 103 in the SDP 300, according to an embodiment. According to the example, a European car manufacturer plans to develop a personalized self-service portal involving a telephone voice objects technology in the SDP 300. The European car manufacturer has a well-known set of brand characteristics associated with the identity of the company, the types of vehicles it manufactures, distributes and sells as well as the German nationality of the country in which the company originated.

The voice objects technology under development in SDP 300 is to be a URSA having software application properties involving user interaction via a telephone utilized in transmitting oral user commands in digitized format to a server hosting the digital marketing URSA. The voice objects technology is to be integrated with the portal which is to facilitate user access to a self service menu heard by the user by sending digitized responses to the user commands in order to enter and process user choices regarding vehicle financing. In the URSA there is to be a fall back option to enable the user to switch over to speak with a human agent representing the vehicle financing service.

The digital marketing URSA is to be developed to provide usability and functions to manage high call volumes while improving user customer satisfaction and reducing service costs. Previously, customers of the European car manufacturer who sought vehicle financing were directed to a single telephone contact number which was serviced entirely by human call center agents taking in all data regarding customer identity and customer choices regarding vehicle financing. The portal associated with the voice objects URSA is to have interactivity regarding customer choices and flexible menus options to assist users to obtain quickly the information which they need or desire to complete their transactions. Other functions associated with the software application properties relate to pre-qualification and authentication schemes to be implemented through the digital marketing URSA. Also, a fall back function is to be incorporated as a routine for routing a user to the most appropriate live agent to meet their specific needs.

Information regarding multiple software application properties, defined by quantitative objective and/or qualitative measures, may be associated with each of the above-described functions and entered as input data 105 to be initialized in the requirements-design module 101. A focus while developing the above described application is the voice objects technology, it's integration into a website associated application, and developing the functionality of self service etc., while enhancing the brand characteristics associated with the company identity and without having a negative impact on the brand characteristics.

The information regarding the brand characteristics received as input data 105 in the BIV system 100 include information about the company and products to which the application relates to. The brand characteristics include that the identity of the company is associated with one of the oldest brands in automobiles and the company has a history of converting company plants into armaments factories in wartime. Although the company is global it is associated with its German origins which represents high quality, being organized and efficient. A visual brand characteristic is the association with a silver gray color. The company has brand characteristics associating it with being innovative. The company has brand characteristics as appealing to middle aged and older demographic groups who have significant wealth and/or responsibility. These brand characteristics may be received through the dashboard 104 or from storage in the data storage 107. The brand characteristics information is received to be initialized in the requirements design-module 101 with the information regarding the software application properties.

The requirements design-module 101 determines one or more software application properties and brand characteristics from the input data 105 received as the quantitative and/or qualitative information as described. In determining the software application properties and brand characteristics to be associated with the portal and the voice objects technology, the requirements design-module 101 may utilize other information stored in the SDP database and/or the testing database 203 and/or other sources of information which may be received through the dashboard 104.

The BIV testing engine 103 receives the determined brand characteristics and software application properties from the requirements design-module 101 and utilizes them to identify design test procedures to produce quantitative and/or qualitative design test results. The design test results are identified using the input data 105 and optionally other data stored in the SDP database 106 or other sources to assess the brand impact based on the determined brand characteristics and the determined software application properties. The design test procedures may form part of a design test plan implemented in the design test step 302.

An example of design test procedures which are implemented through the BIV testing engine 103 may include verifying whether the portal demonstrates the element of innovation through its appearance and user experience. Another design test procedure may verify whether the portal or other program sub-components support the German language as a first choice.

Another example of BIV design test procedures may include verifying whether the portal interface has a silver gray color. This test may be an objective measurement in terms of color index. The results of these tests are analyzed and reported as brand impact data 108. If less than desirable results are initially obtained the simulations module 200 in the BIV testing engine 03 may be utilized with different but related modeling data 201 or scenario data 202 to obtain optimized outcome data 204 with respect to the quantitative and qualitative BIV design test results associated with the brand impact based on the determined brand characteristics and the determined software application properties.

The design test plan may also include tests not relating to the BIV design test procedures and may include tests of the voice objects technology for operability with certain server types and its integration, self service functionalities etc which are not implemented through the BIV testing engine 103.

Following the SDP design step 302 where the test plan is designed, the BIV tests may be implemented in step 304 through BIV testing engine 103 such as a brand audit which is a procedure to actually verify and test the impact on the brand utilizing one or more of the tests in the test plan designed in 302. Also during the deployment phase that is step 305 the same testing and testing results may be shared with a brand owner as a brand intactness confirmation. This may be concluded with a formal sign off from the brand owner. A similar set of tests and testing procedures to verify impact on the brand may be utilized in step 306 namely the operate and support phase as the changes and/or updates incorporated in the URSA over time may cause an impact on the brand.

4. Methods

Figure 4:
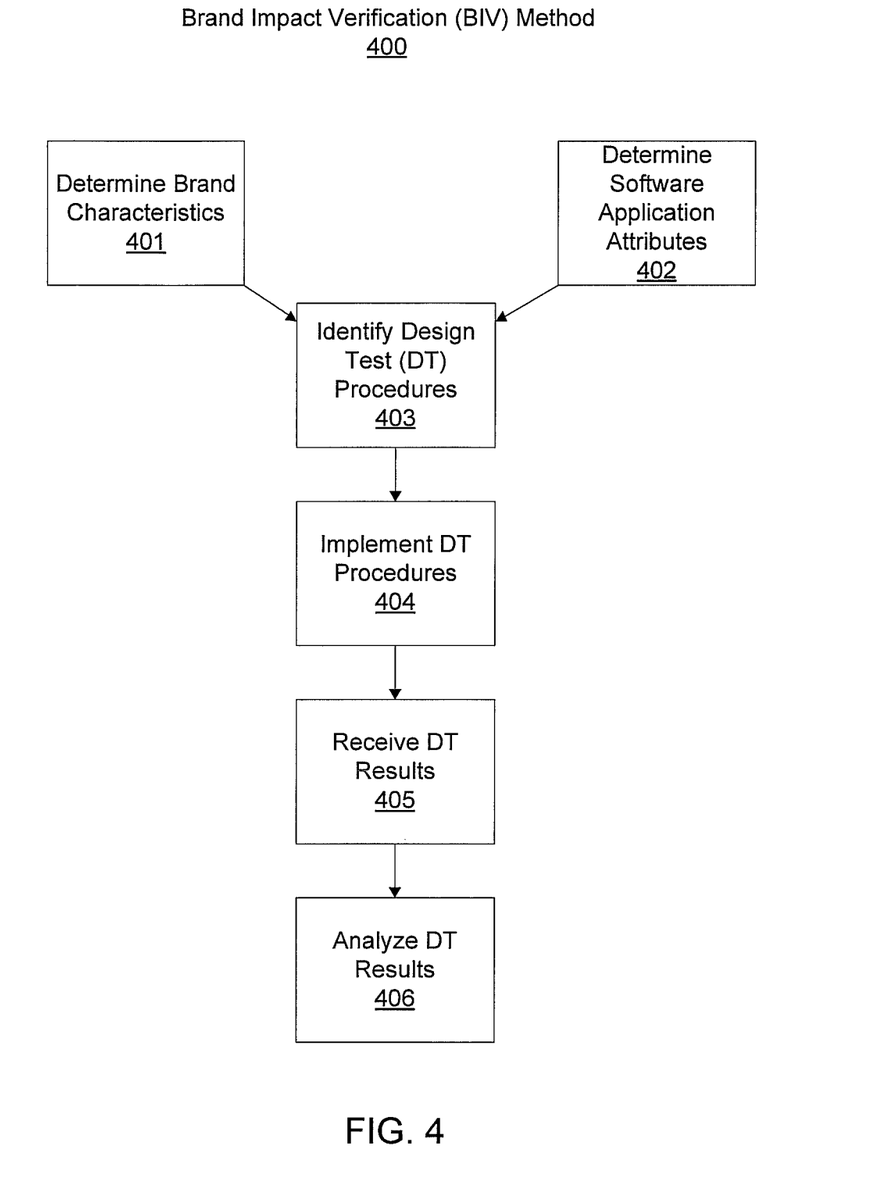
FIG. 4 is a flowchart illustrating a BIV method 400, according to an embodiment.

FIG. 4 illustrates a method 400 according to embodiment, for performing BIV with respect to an identity associated with a URSA under development in a SDP. The method is described with respect to the BIV system 100 shown in FIG. 1 by way of example and not limitation. The method may be performed in other systems. The steps of the methods may be performed in a different sequence or one or more may be omitted.

At steps 401 and 402, the requirements-design module 101 determines, respectively, the brand characteristics and the software application properties for the URSA. The brand characteristics can be objective measures associated with an identity which may be the company. The objective measures may include an age range, a combination of colors, an association with a particular society, an association with particular message (e.g. environmental friendliness) or any other measures of the demographic to which the brand is directed. The brand characteristics may also be yes or no measures with respect to other measures such as an association with a particular society, an association with a social message, a geographic region, a defined demographic or other parameter. The brand characteristics may also be subjective measures. The software product properties may include quantitative and/or qualitative measures.

At step 403, the BIV testing engine 103 identifies design test procedures to produce quantitative and/or qualitative design test results associated with the brand impact based on the determined brand characteristics and the determined software application properties. The identified design test procedures may include a procedure configured to generate data to determine an objective measure which quantifies a software application property associated with the URSA. They may also include procedures configured to generate data to determine a subjective impression of a software application property associated with the URSA or to determine if a software application property has a negative impact on a brand characteristic if the software application property is associated with the URSA.

At step 404, one or more of the identified design test procedures are implemented automatically within the BIV testing engine 103, according to an embodiment. In one embodiment, the design test procedures are implemented in the SDP in a SDP design step prior to implementing an SDP full implementation test step testing a full implementation of the URSA.

At step 405, the brand impact results module 102 receives the design test results from the BIV testing engine 103.

And at step 406, the brand impact results module 102 analyzes the design test results.

5. Computer System for Executing Software

One or more of the steps and functions described herein and one or more of the components of the systems described herein may be implemented as computer code comprising computer readable instructions stored on a computer readable storage device, such as memory or another type of storage device. The computer code is executed on a computer system, such as computer system 500 described below by a processor, such as an application-specific integrated circuit (ASIC), or other type of circuit. The code may exist as software programs comprised of program instructions in source code, object code, executable code or other formats.

Figure 5:
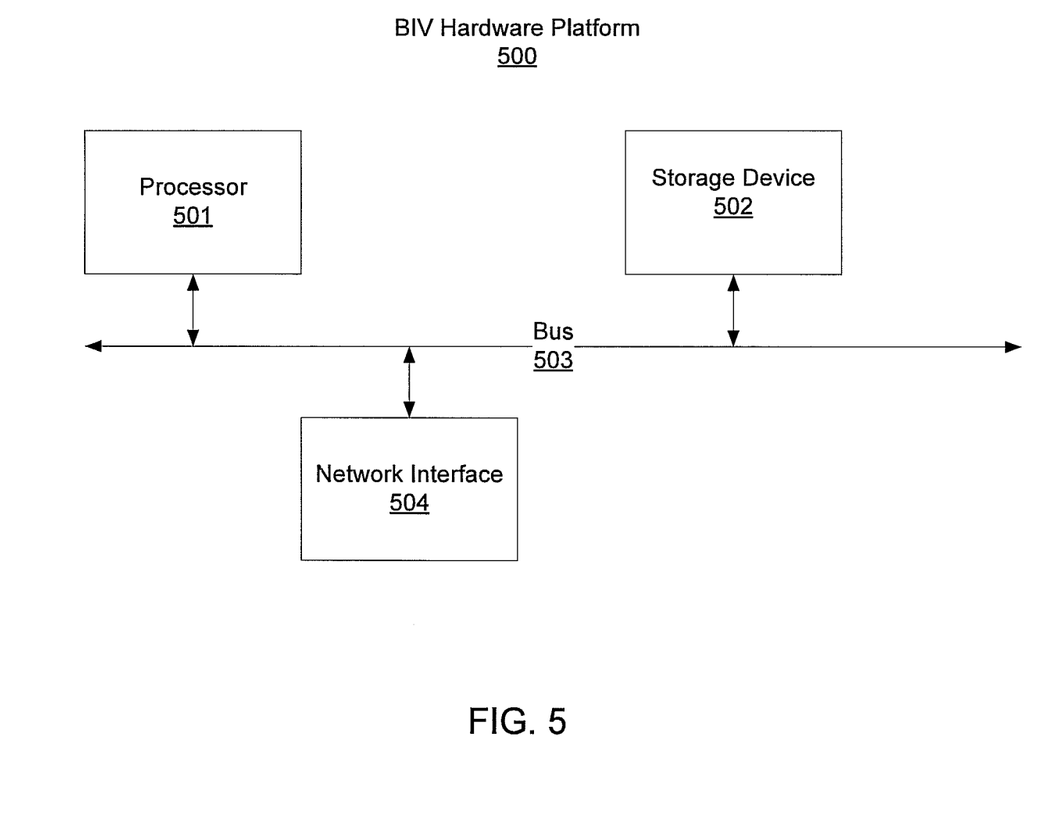
FIG. 5 is a block diagram illustrating a computer system configured to provide a hardware platform for the BIV system 100 shown in FIG. 1, according to an embodiment.

FIG. 5 shows a computer system 500 which may be used as a hardware platform for the BIV system 100 and/or the BIV testing engine 103. Computer system 500 may be used as a platform for executing one or more of the steps, methods, and functions described herein that may be embodied as software stored on one or more computer readable storage devices, which are hardware storage devices.

The computer system 5400 includes a processor 501, or processing circuitry, that may implement or execute software instructions performing some or all of the methods, functions and other steps described herein. Commands and data from processor 501 are communicated over a communication bus 503. Computer system 500 also includes a computer readable storage device 502, such as random access memory (RAM), where the software and data for processor 501 may reside during runtime. Storage device 502 may also include non-volatile data storage. Computer system 500 may include a network interface 504 for connecting to a network. It is apparent to one of ordinary skill in the art that other known electronic components may be added or substituted in computer system 500.

Furthermore, the systems and methods described herein are generally described with respect to testing and measuring a URSA utilizing the BIV system 100 and/or the BIV testing engine 103 operable in BIV methods. However, the systems and methods are applicable to testing other types of software applications other than a URSA.

While the embodiments have been described with reference to examples, those skilled in the art are able to make various modifications to the described embodiments without departing from the scope of the embodiments as described in the following claims, and their equivalents.

What is claimed is:

1. A system to perform brand impact verification (BIV) for a utilization-related software application (URSA), associated with an identity and a software development process (SDP) including multiple phases, the system comprising:
    a requirements-design module to determine modeling data including brand characteristics of a brand associated with the identity, software application properties associated with the URSA, and desired benchmarks for design test results, wherein the desired brand characteristics comprise a visual desired brand characteristic, and the visual desired brand characteristic comprises at least one of a color index, a defined pigmentation and modalities of chromaticity ranges defining a color; and
    a BIV testing engine, executed by a computer system, to
        identify design test procedures to produce design test results associated with a brand impact being verified based on the determined brand characteristics and the determined software application properties, and implement the design test procedures on the URSA to generate the design test results in an SDP design step of an SDP of the URSA,
        verify the brand impact for the URSA, the verifying comprising:
            comparing the generated design test results with the desired benchmarks associated with the determined brand characteristics, wherein the generated design test results include a visual design test result comprising at least one a color index, a pigmentation and a modality of chromaticity ranges determined for the URSA, and the comparing of the generated design test results with the desired benchmarks comprises comparing the visual desired brand characteristic with the visual design test result, and
            comparing the generated design test results with the determined software application properties,
        generate feedback data to select alternate modeling data responsive to a failure of the generated design test results to reach the desired benchmarks, and
        generate outcome data to report the verification responsive to the generated design test results reaching the desired benchmarks,
    wherein the design test procedures are implemented in the SDP in a SDP design step prior to implementing an SDP full implementation test step testing a full implementation of the URSA.

2. The system of claim 1, wherein the identified design test procedures are included in a design test plan implemented in the SDP design step concurrently with testing utility aspects of the URSA.

3. The system of claim 1, wherein the identified design test procedures include a procedure to generate data to determine an objective measure which quantifies a software application property associated with the URSA.

4. The system of claim 1, wherein the identified design test procedures include a procedure to generate data to determine a subjective impression of a software application property associated with the URSA.

5. The system of claim 1, wherein the identified design test procedures include a procedure to generate data to determine if a software application property has a negative impact on a brand characteristic if the software application property is associated with the URSA.

6. The system of claim 1, wherein the determined brand characteristics are determined in an establish requirements step in the SDP, and
    wherein the SDP establish requirements step is implemented in the SDP prior to implementing the SDP full implementation test step testing a full implementation of the URSA.

7. The system of claim 1, wherein the determined software application properties are determined in the design step in the SDP.

8. The system of claim 1, wherein the BIV testing engine performs a brand audit procedure in a SDP full implementation testing step in the SDP, and wherein the SDP full implementation testing step is implemented after implementing a SDP build step in the SDP.

9. The system of claim 8, wherein the BIV testing engine performs a brand intactness confirmation procedure in a SDP deployment step in the SDP, and wherein the SDP deployment step is implemented after implementing the SDP build step in the SDP.

10. The system of claim 9, wherein the BIV testing engine performs a brand impact check procedure as a part of an operate and support SDP step in the SDP, wherein the operate and support SDP step is implemented after implementing the SDP deployment step in the SDP.

11. A method of performing brand impact verification (BIV) for a utilization-related software application (URSA), associated with an identity and a software development process (SDP) including multiple phases, the method comprising:
    determining modeling data including brand characteristics of a brand associated with the identity, software application properties associated with the URSA, and desired benchmarks for design test results, wherein the desired brand characteristics comprise a visual desired brand characteristic, and the visual desired brand characteristic comprises at least one of a color index, a defined pigmentation and modalities of chromaticity ranges defining a color;
    identifying design test procedures to produce design test results associated with a brand impact being verified based on the determined brand characteristics and the determined software application properties; and
    implementing the design test procedures on the URSA, by a computer, to generate the design test results in an SDP design step of an SDP of the URSA, verifying the brand impact for the URSA, the verifying comprising:
comparing the generated design test results with the desired benchmarks associated with the determined brand characteristics, wherein the generated design test results include a visual design test result comprising at least one a color index, a pigmentation and a modality of chromaticity ranges determined for the URSA, and the comparing of the generated design test results with the desired benchmarks comprises comparing the visual desired brand characteristic with the visual design test result, and
comparing the generated design test results with the determined software application properties,
generating feedback data to select alternate modeling data responsive to a failure of the generated design test results to reach the desired benchmarks, and
generating outcome data to report the verification responsive to the generated design test results reaching the desired benchmarks,
wherein the design test procedures are implemented in the SDP in a SDP design step prior to implementing an SDP full implementation test step testing a full implementation of the URSA.

12. The method of claim 11, wherein the identified design test procedures are included in a design test plan implemented in the SDP design step concurrently with testing utility aspects of the URSA.

13. The method of claim 11, wherein the identified design test procedures include a procedure to generate data to determine an objective measure which quantifies a software application property associated with the URSA.

14. The method of claim 11, wherein the identified design test procedures include a procedure to generate data to determine a subjective impression of a software application property associated with the URSA.

15. The method of claim 11, wherein the identified design test procedures include a procedure to generate data to determine if a software application property has a negative impact on a brand characteristic if the software application property is associated with the URSA.

16. The method of claim 11, wherein the determined brand characteristics are determined in an establish requirements step in the SDP, and
wherein the SDP establish requirements step is implemented in the SDP prior to implementing the SDP full implementation test step testing a full implementation of the URSA.

17. The method of claim 11, wherein the determined software application properties are determined in the design step in the SDP.

18. The method of claim 11, wherein the BIV testing engine performs a brand audit procedure in a SDP full implementation testing step in the SDP, and wherein the SDP full implementation testing step is implemented after implementing a SDP build step in the SDP.

19. The method of claim 18, wherein the BIV testing engine performs a brand intactness confirmation procedure in a SDP deployment step in the SDP, and wherein the SDP deployment step is implemented after implementing the SDP build step in the SDP.

20. The method of claim 19, wherein the BIV testing engine performs a brand impact check procedure as a part of an operate and support SDP step in the SDP, wherein the operate and support SDP step is implemented after implementing the SDP deployment step in the SDP.

21. A non-transitory computer readable medium storing computer readable instructions that when executed by a computer system perform method of performing brand impact verification (BIV) for a utilization-related software application (URSA), associated with an identity and a software development process (SDP) including multiple phases, the method comprising:
determining modeling data including brand characteristics of a brand associated with the identity, software application properties associated with the URSA, and desired benchmarks for design test results, wherein the desired brand characteristics comprise a visual desired brand characteristic, and the visual desired brand characteristic comprises at least one of a color index, a defined pigmentation and modalities of chromaticity ranges defining a color;
identifying design test procedures to produce design test results associated with a brand impact being verified based on the determined brand characteristics and the determined software application properties; and
implementing the design test procedures on the URSA to generate the design test results in an SDP design step of an SDP of the URSA,
verifying the brand impact for the URSA, the verifying comprising:
comparing the generated design test results with the desired benchmarks associated with the determined brand characteristics, wherein the generated design test results include a visual design test result comprising at least one a color index, a pigmentation and a modality of chromaticity ranges determined for the URSA, and the comparing of the generated design test results with the desired benchmarks comprises comparing the visual desired brand characteristic with the visual design test result, and
comparing the generated design test results with the determined software application properties,
generating feedback data to select alternate modeling data responsive to a failure of the generated design test results to reach the desired benchmarks, and
generating outcome data to report the verification responsive to the generated design test results reaching the desired benchmarks,
wherein the design test procedures are implemented in the SDP in a SDP design step prior to implementing an SDP full implementation test step testing a full implementation of the URSA.

* * * * *